(12) United States Patent
Schweizer et al.

(10) Patent No.: US 7,165,919 B2
(45) Date of Patent: Jan. 23, 2007

(54) MACHINE TOOL WITH A MACHINE BASE

(75) Inventors: Anton Richard Schweizer, Wurmlingen (DE); Hans-Henning Winkler, Tuttlingen (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 0 days.

(21) Appl. No.: 11/218,394

(22) Filed: Sep. 2, 2005

(65) Prior Publication Data

US 2006/0056931 A1    Mar. 16, 2006

(30) Foreign Application Priority Data

Sep. 8, 2004  (DE) ................ 10 2004 044

(51) Int. Cl.
*B23C 9/00*    (2006.01)
*B23Q 11/00*   (2006.01)
*B23Q 1/01*    (2006.01)

(52) U.S. Cl. .................. 409/137; 409/235; 82/901; 82/149; 408/67; 408/234; 29/DIG. 94; 29/DIG. 61; 29/DIG. 79; 29/DIG. 101

(58) Field of Classification Search ................ 409/137, 409/134, 135–136, 235; 408/67, 234; 82/149, 82/901; 29/DIG. 94, DIG. 101, DIG. 102, 29/DIG. 91, DIG. 93, DIG. 79, DIG. 61
See application file for complete search history.

(56) References Cited

U.S. PATENT DOCUMENTS

| | | | | |
|---|---|---|---|---|
| 1,926,997 A | * | 9/1933 | Hoelscher et al. | 82/149 |
| 1,978,373 A | * | 10/1934 | Millard | 82/901 |
| 2,047,034 A | * | 7/1936 | Roehm et al. | 82/901 |
| 3,702,740 A | * | 11/1972 | Pettigrew | 408/56 |
| 4,545,271 A | * | 10/1985 | Romi | 82/149 |
| 4,685,361 A | * | 8/1987 | Myers | 82/149 |
| 4,955,770 A | | 9/1990 | Kitamura | |
| 5,113,558 A | * | 5/1992 | Soroka et al. | 409/137 |
| 5,586,848 A | * | 12/1996 | Suwijn | 409/137 |
| 5,611,137 A | | 3/1997 | Braun | |
| 6,120,222 A | * | 9/2000 | Hiramoto et al. | 409/137 |
| 6,161,457 A | * | 12/2000 | Hammer | 82/121 |
| 6,210,085 B1 | | 4/2001 | Haninger | |
| 6,364,582 B1 | | 4/2002 | Hoppe et al. | |
| 6,641,341 B2 | * | 11/2003 | Sato et al. | 409/137 |
| 6,722,236 B1 | * | 4/2004 | Baldini et al. | 82/149 |
| 6,745,455 B2 | * | 6/2004 | Popp et al. | 409/137 |
| 7,044,693 B2 | * | 5/2006 | Fujiwara | 409/137 |
| 7,044,696 B2 | * | 5/2006 | Hiramoto et al. | 409/235 |
| 2002/0011137 A1 | * | 1/2002 | Nakaminami et al. | 82/117 |

(Continued)

FOREIGN PATENT DOCUMENTS

DE    44 41 253 A1    5/1996

(Continued)

*Primary Examiner*—Erica Cadugan
(74) *Attorney, Agent, or Firm*—Harness, Dickey & Pierce, P.L.C.

(57) ABSTRACT

In a machine tool (10) with a machine base (11), a working area (14), in which workpieces (13) are machined, and a device (25), which receives chips (24) formed during machining of the workpieces (13) from the working area (14) and conveys them onward, at least one tunnel (31, 33) provided for receiving one end (39) of a chip conveyor (38) is provided in the machine base (11), which tunnel extends at least to below the device (25) and is there of upwardly open (28) design.

14 Claims, 3 Drawing Sheets

U.S. PATENT DOCUMENTS

| | | | |
|---|---|---|---|
| 2002/0056344 A1* | 5/2002 | Crudgington et al. | 82/1.11 |
| 2002/0164222 A1* | 11/2002 | Sato et al. | 409/137 |
| 2003/0021647 A1* | 1/2003 | Groitl et al. | 409/137 |
| 2004/0107805 A1* | 6/2004 | Baldini et al. | 82/117 |
| 2005/0031427 A1* | 2/2005 | Hiramoto et al. | 409/137 |
| 2005/0061120 A1* | 3/2005 | Hammer et al. | 82/122 |
| 2006/0045641 A1* | 3/2006 | Anderson et al. | 409/137 |

FOREIGN PATENT DOCUMENTS

| | | |
|---|---|---|
| DE | 197 26 952 A1 | 1/1999 |
| DE | 199 18 359 C2 | 11/2000 |
| DE | 202 12 527 U1 | 11/2002 |
| EP | 0 417 137 B1 | 3/1991 |
| EP | 528052 A1 * | 2/1993 |
| EP | 0 879 671 A2 | 11/1998 |
| EP | 899047 A2 * | 3/1999 |
| EP | 1 122 026 A1 | 8/2001 |
| JP | 61-103754 A * | 5/1986 |
| JP | 63-99153 | 4/1988 |
| JP | 2-274453 A * | 11/1990 |
| WO | WO 89/10886 | 11/1989 |
| WO | WO 2004/054756 | 7/2004 |

* cited by examiner

MACHINE TOOL WITH A MACHINE BASE

BACKGROUND OF THE INVENTION

1. Field of the Invention

The present invention relates to a machine tool with a machine base, a working area, in which workpieces are machined, and a device, which receives chips formed during machining of the workpieces from the working area and conveys them onward.

2. Related Prior Art

Such a machine tool is known from EP 0 879 671 A1 or DE 197 26 952 A1, for example.

The known machine tools have a machine base, on which a traveling column can be moved in two directions at right angles to one another in relation to a workpiece table likewise fastened to the machine base. A tool spindle head, which bears a tool spindle, into which tools for machining workpieces clamped on the workpiece table can be chucked, is arranged height-adjustably on the traveling column. Machining of the workpieces takes place in a working area, which is sealed in relation to the moving parts of the machine tool by an appropriate cover.

Arranged below the working area is what is known as a chip tray, into which chips formed during machining of the workpieces and also the coolant sprayed into the working area for cooling the tools and workpieces pass via an obliguely extending sheet. In this way, the chips and the coolant are removed from the working area, both printed specifications leaving open how the chips are removed from the chip tray.

However, it is generally known to arrange what are known as chip conveyors, as are described in WO 2004/054756 A1 for example, behind or next to such machine tools. Such chip conveyors have a horizontally extending conveying portion and also a portion extending upward obliguely, which opens into a chip ejector. Chips passing onto the conveying portion are in this way transported to the chip ejector located higher up, from where they fall into transport containers, which serve for transporting the chips away.

In order that the chips pass from the chip tray onto the chip conveyor, chutes are provided in machine tools known to the applicant, via which the chips fall out of the machine base at the side onto the chip conveyor erected there.

The chip conveyor standing at the side next to the machine tool is in this way always accessible for maintenance measures, which are frequently necessary in particular because the chips become caught on one another and block the chip conveyor, in particular when the latter uses a screw conveyor, as is known from EP 0 417 137 A1, for transporting the chips.

However, chip conveyors with a conveying belt, as are described in WO 2004/054756 A1 mentioned in the introduction, also require frequent maintenance.

In such machine tools, it is generally found to be a disadvantage that the space requirement necessary for erecting machine tools and chip conveyors is relatively large, the construction of the machine tool also being made more complicated by virtue of the fact that measures have to be taken in order to transport the chips from the chip tray to the chip conveyor.

In such machine tools where the chip conveyor is arranged at one side of the machine tool, the switch cabinet, which accommodates the electric and pneumatic control for the machine tool, is arranged on the rear side of the machine tool. As the switch cabinet always has to be accessible, it is then not possible in such machine tools to arrange the chip conveyor behind the machine tool, although this would frequently be desirable for reasons of space.

In machine tools known from the prior art and also in associated chip conveyors, the fact that as a rule each machine tool has to be assigned its own chip conveyor or that complicated conveying tracks have to be used for transporting the chips away, as is described in detail in EP 0 417 137 A1 mentioned at the outset, is found to be a further disadvantage.

SUMMARY OF THE INVENTION

In view of the above, one object of the present invention is to improve the machine tool mentioned in the outset in such a way that greater flexibility is possible in the arrangement of the chip conveyor without the space requirement for erecting machine tool and chip conveyor being increased.

In the machine tool mentioned in the outset, this object is achieved according to the invention by virtue of the fact that at least one tunnel provided for receiving one end of a chip conveyor is provided in the machine base, which tunnel extends at least to below the device and is there of upwardly open design.

The object underlying the invention is achieved completely in this way.

This is because the inventors of the present application have recognized that it is possible to arrange one end of the chip conveyor, preferably its conveying portion, directly below the device for receiving and removing the chips from the working area, to which end the at least one tunnel is according to the invention provided in the machine base.

Surprisingly, such a tunnel in the machine base does not affect the stability or thus the machining accuracy achievable with the machine tool to the extent originally feared. It is therefore possible to provide in the machine base a tunnel leading to below the working area, which upwardly has an opening facing into the working area, through which chips can fall directly onto the conveying portion of a pushed-in chip conveyor.

In this way, the construction of the novel machine tool is very simple, the device for removing chips from the working area consisting essentially of the opening provided at the bottom in the working area and also, if appropriate, obliquely arranged guide sheets for chips falling down.

As the chip conveyor is now located mainly in the machine base of the machine tool, the overall space requirement for erecting machine tool and chip conveyor is smaller than if the chip conveyor were to stand completely next to the machine tool.

The chip conveyor can also be pulled out of the tunnel at any time in order to carry out necessary maintenance work. As the chip conveyor is not screwed together firmly with the machine tool, this can be effected without any problems, the space requirement necessary for pulling the chip conveyor out being selectable in such a way by suitable arrangement of two machine tools that the appropriate space requirement can be used alternately by two or even more machine tools.

According to a further object, it is preferred if the at least one tunnel extends transversely through the machine base and has an opening on each of the two longitudinal sides of the machine tool for pushing in one end of a chip conveyor.

This measure affords the advantage that the chip conveyor can be pushed into the machine tool either from the left or from the right, so that, with machine tools arranged next to one another, in each case two machine tools have between them the space requirement for pulling out a chip conveyor, the chip conveyor being pushed in from the right in the left machine tool and the chip conveyor accordingly being pushed in from the left in the right machine tool.

However, the tunnel passing transversely through the machine base affords the further possibility of interlinking a number of machine tools with regard to chip removal. It is possible, for example, to guide a conveyor belt through a number of machine tools, which are arranged next to one another in such a way that the tunnels are each aligned with one another, which conveyor belt acts as it were like a very long conveying portion of a chip conveyor and guides the chips to a chip ejector, where the chips of a number of machine tools are collected and transported away together.

In this way, the space requirement of each individual machine tool is again reduced distinctly in relation to known machine tools with a separate chip conveyor in each case.

On the other hand, it is preferred if the at least one tunnel extends in the longitudinal direction of the machine tool and has at the rear side of the latter an opening for pushing in one end of a chip conveyor.

This measure affords the advantage that the chip conveyor can be pushed into the machine tool from the rear, so that no space at all has to be provided for a chip conveyor at the side next to the machine tool. The switch cabinet usually arranged on the rear side of the machine tool can then be arranged at the side on the machine tool, for example, where it occupies less space than a chip conveyor arranged there would occupy.

According to another object, it is preferred, however, if a switch cabinet, which extends over the opening of the tunnel in a U-shape from above, is arranged on the rear side of the machine tool.

In this case, it is advantageous that the switch cabinet can remain on the rear side of the machine tool. The tunnel now extends through the switch cabinet as well as it were, the cabinet being for this purpose designed like a downwardly open U.

In this way, the space available for the control devices in the switch cabinet may be reduced, but this does not constitute a major problem as some of the control devices can also be arranged elsewhere in the housing of the machine tool.

According to a still further object, it is generally preferred, if the at least one tunnel widens in a funnel-shape toward the opening.

This measure affords the advantage that the space required next to or behind the machine tool for pulling the chip conveyor out and pushing it in is further reduced because the chip conveyor can be pulled out of the machine base at an angle, for which a space is required which is smaller than if the chip conveyor were to be pulled out at right angles to the machine tool.

It is generally also preferred if the at least one tunnel is of downwardly open design at least in portions.

This measure affords the advantage that conventional chip conveyors, which are provided with rollers with which they can be moved on the supporting surface, can be used without constructional changes in order to be pushed into the tunnels of the novel machine tool. In this operation, the tunnel guides the inner end of the chip conveyor, so that it comes to lie below the opening to the working area automatically, that is without adjustment work.

According to a further object, it is especially preferred, if a tunnel which extends transversely through the machine base is provided, and a further tunnel which extends to the rear side of the machine tool and opens in a funnel-shape there is provided.

In this way, it is alternatively possible to push a chip conveyor into the novel machine tool from the left or the right or from the rear, so that the machine tool is equipped for different space conditions.

Trials in the premises of the applicant have shown that even a machine base equipped with such tunnels is still so stable that the machining accuracy of the machine tool constructed on this machine base meets even the highest requirements.

In this connection, it is generally preferred if the machine tool has at least one tool spindle for receiving the tools and a workpiece table for clamping the workpieces, the at least one tool spindle and the workpiece table being movable relative to one another, and the at least one tool spindle is preferably mounted on the machine base via a traversing apparatus.

The inventors of the present application have recognized that, in particular in such a traveling column machine, both the tunnel running transversely and the tunnel running longitudinally to the rear side can be provided without the machining accuracy of such a machine tool suffering.

Further advantages become aparent from the description and the accompanying drawing.

It is understood that the features mentioned above and those still to be explained below can be used not only in the combinations indicated but also in other combinations or on their own without leaving the scope of the present invention.

BRIEF DESCRIPTION OF THE DRAWINGS

Embodiments of the invention are shown in the drawing and explained in greater detail in the description below. In the figures.

DETAILED DESCRIPTION OF PREFERRED EMBODIMENTS

Figure 1:
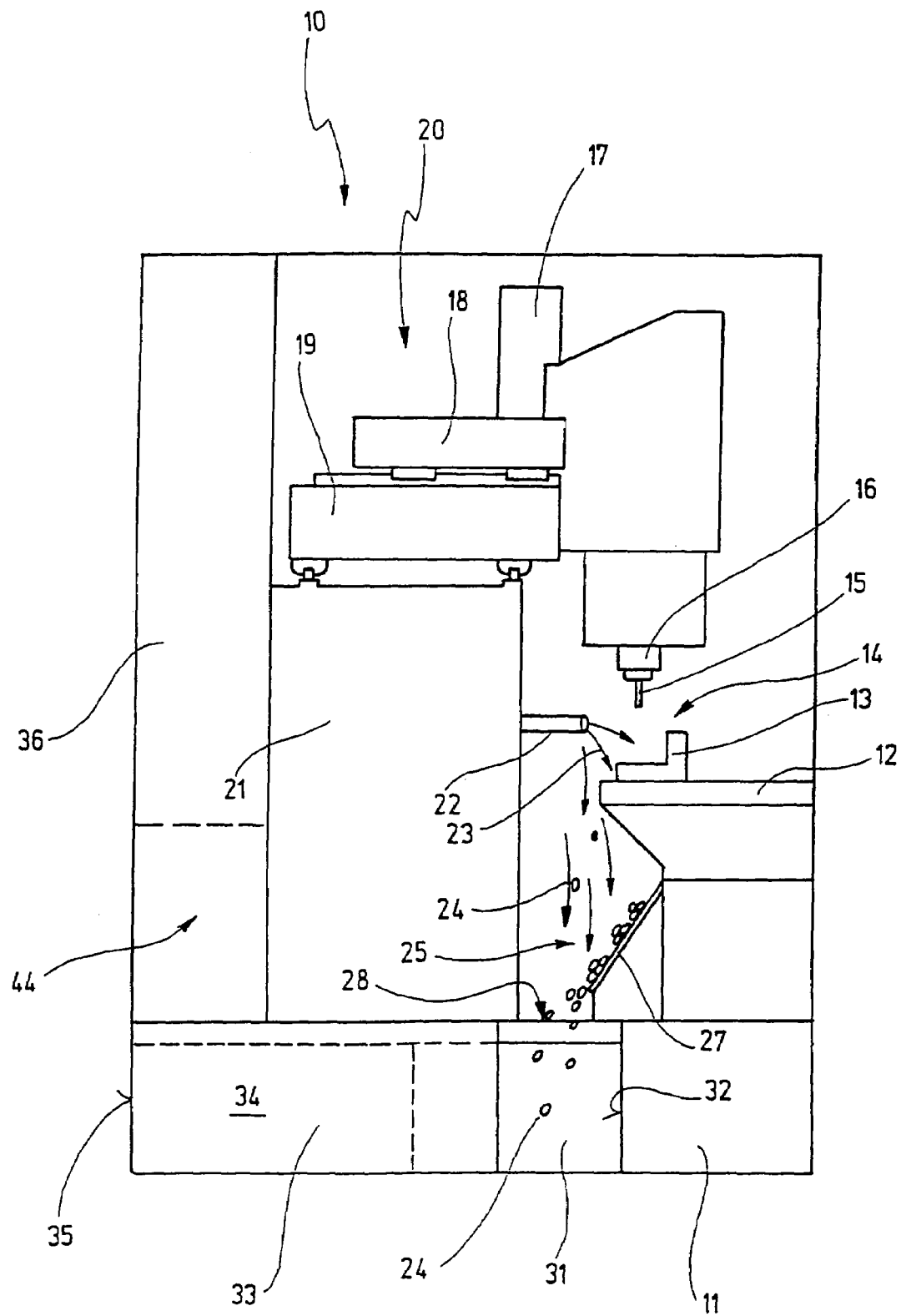
FIG. 1 shows a diagrammatic side view of a machine tool according to the invention.

In FIG. 1, a machine tool, shown in a diagrammatic side view, is designated by 10. The machine tool 10 comprises a machine base 11, on which, at the front, a workpiece table 12 is arranged, on which a workpiece 13 is clamped, which is machined in a working area 14.

The machining of the workpiece 13 is carried out by means of a tool 15, which is borne by a tool spindle 16. The tool spindle 16 is in a manner known per se mounted height-adjustably on a traveling column 17 via a spindle head, which column is in turn located on a first slide 18, which is movable horizontally in the drawing plane in FIG. 1. The first slide 18 is located on a second slide 19, which can be moved at right angles to the drawing plane in FIG. 1.

The traveling column 17 and the slides 18 and 19 form a traversing apparatus 20, with which the tool 15 can be moved in the working area 14 in relation to the workpiece 13.

It should also be mentioned that the slide 19 is connected to the machine base 11 via a frame part 21.

During machining of the workpiece 13 with the tool 15, coolant 23 is delivered into the working area 14 from a diagrammatically indicated flushing pipe in order to cool the workpiece 13 and the tool 15 and to flush off chips 24 formed, so that they fall downward into a device 25, which comprises an obliquely arranged sheet 27, by means of which the chips fall downward out of the working area 14 via an opening 28.

Provided below the opening 28 is a tunnel 31, which extends transversely through the machine tool 10 and has an opening 32, which can be seen in FIG. 1.

In the machine base 11, a further tunnel 33 moreover extends from the opening 28 toward the rear, where it widens in its rear portion 34 in a funnel-shape to an opening 35.

A switch cabinet 36, below which the tunnel 33 runs through, is also arranged on the rear side of the machine tool 10.

A chip conveyor can now be pushed into both the tunnel 31 and the tunnel 33, as is now explained with reference to the perspective illustration in FIG. 2.

Figure 2:
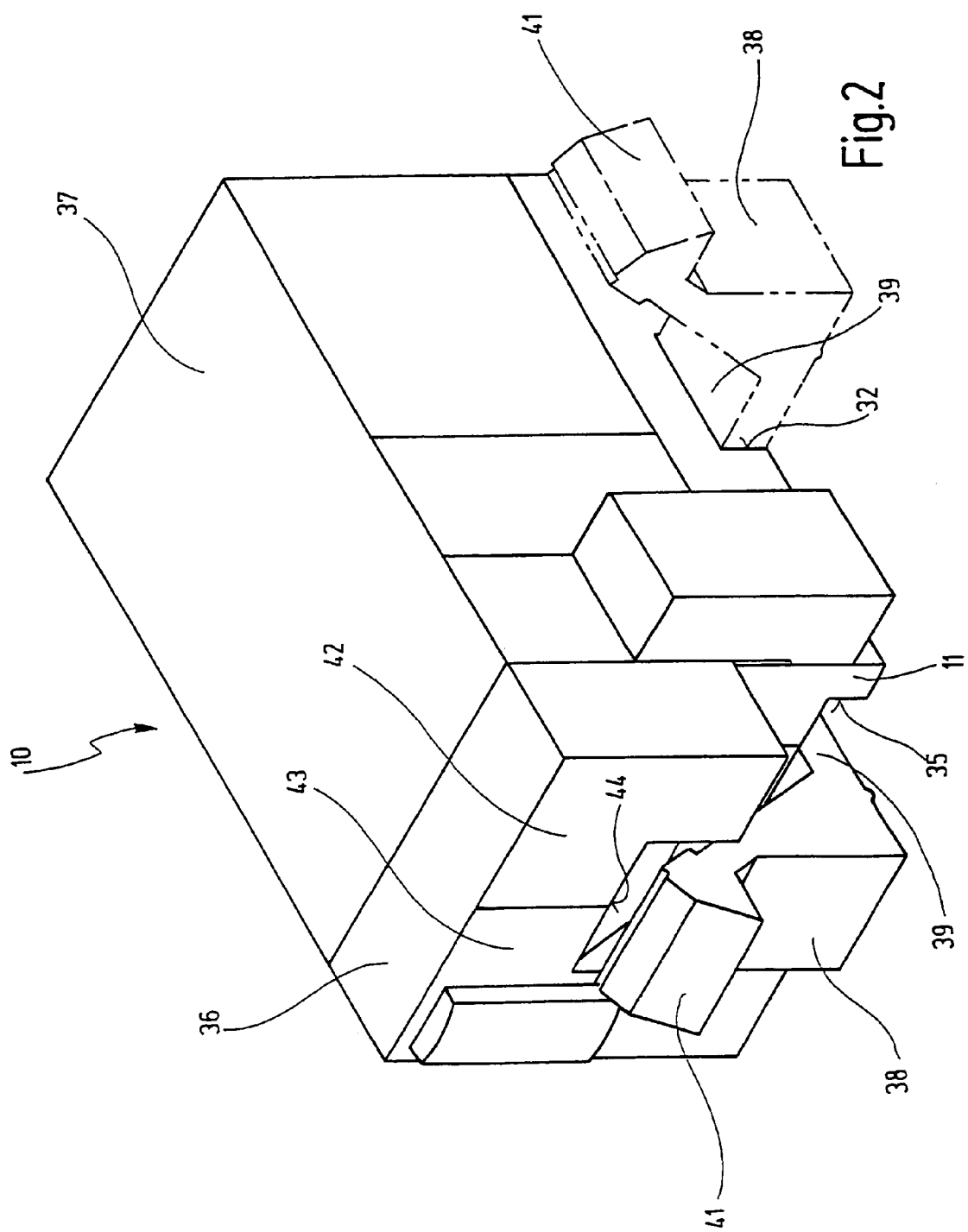
FIG. 2 shows a perspective illustration of a machine tool according to the invention.

In FIG. 2, the machine tool 10 is shown only diagrammatically; essentially, its housing 37 and the switch cabinet 36 can be seen.

A chip conveyor indicated at 38, the conveying portion 39 of which extends into the tunnel 33 below the opening 28, is pushed into the opening 35. In the chip conveyor 38, the conveying portion 39 is adjoined by a chip ejector 41 located higher up, from which the chips which have fallen through the opening 28 onto the conveying end 39 and been transported to the chip ejector 41 fall into a transport container not illustrated in the drawing.

It can also be seen in FIG. 2 that the switch cabinet 36 has two doors 42, 43 and overall the shape of a downwardly open U, so that a free space 44 is formed, which is indicated diagrammatically in FIG. 1 as well.

This arrangement makes it possible to open the doors 42, 43 even when the chip conveyor 38 is pushed into the tunnel 33.

As indicated in broken lines in FIG. 2, the chip conveyor 38 can also be pushed into the tunnel 31 at the side through the opening 32 if the space conditions make this necessary.

Figure 3:
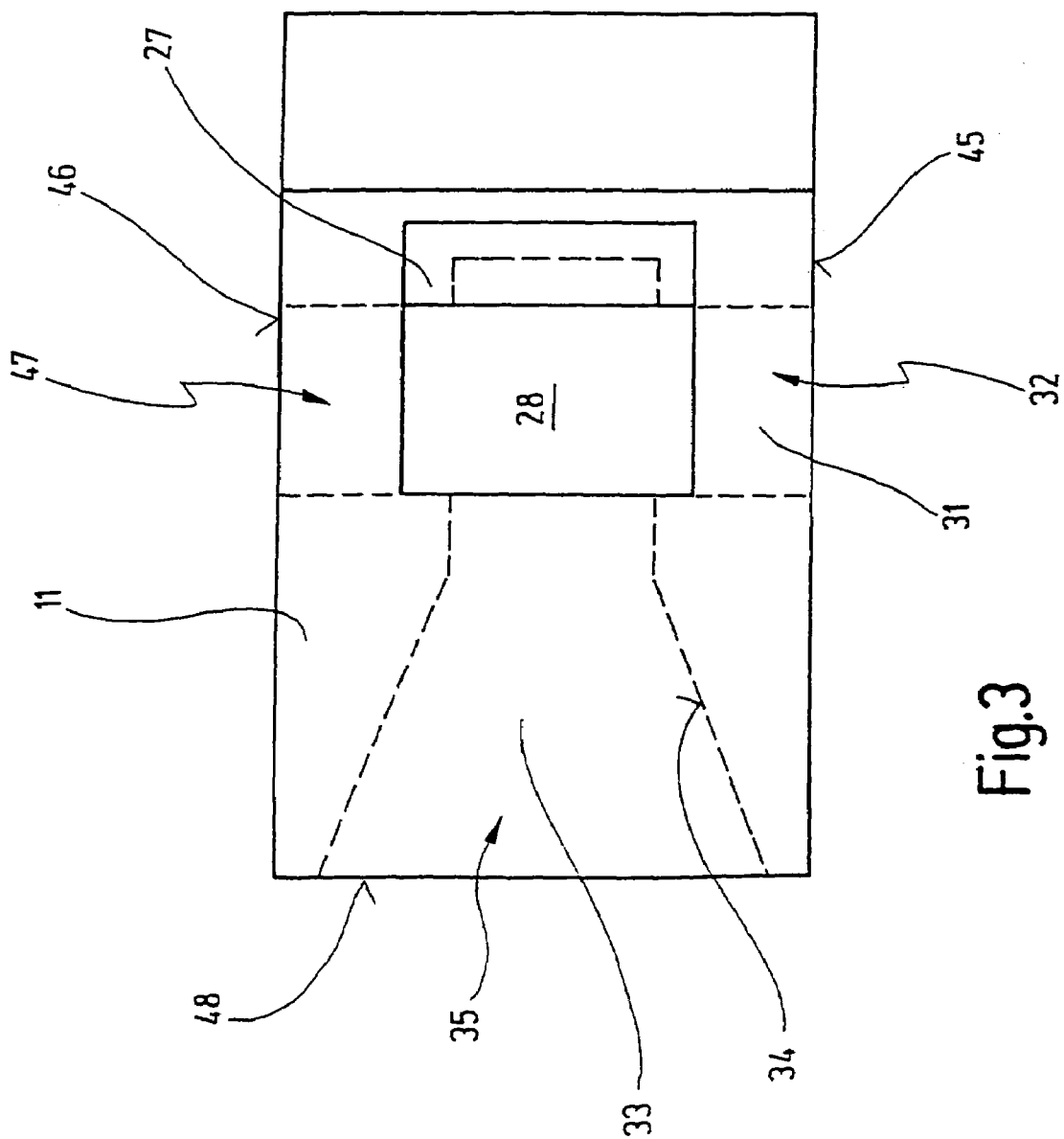
FIG. 3 shows a top view of a diagrammatically illustrated machine base such as can be used in the machine tools from FIG. 1 and FIG. 2.

In FIG. 3, the machine base 11 such as is used in the machine tools 10 from FIGS. 1 and 2 is illustrated in a diagrammatic top view.

It can be seen that the tunnel 31 passes through the machine base 11 transversely and is located with its opening 32 in one longitudinal side 45, while it has an opening 47 on the opposite longitudinal side 46. In this way, it is possible to push a chip conveyor into the machine base 11 from the left or from the right or to interlink machine tools 10 standing next to one another in such a way that their chips are transported away together at the side through the tunnels 31.

Finally, it can also be seen that the tunnel 33 widens with its rear portion 34 in a funnel-shape to the opening 35 provided in the rear wall 48. In this way, it is possible to pull the chip conveyor 38 out of the machine base 11 not only in the longitudinal direction of the machine tool 10 but also at an angle to it, so that the space requirement for pulling the chip conveyor 38 out is smaller than if it had to be pulled out straight.

It is of course also possible to widen the tunnel 31 in a funnel-shape toward the openings 32 and 47.

Both the tunnel 31 and the tunnel 33 are downwardly open, so that the chip conveyor 38 can, with its rollers running on the supporting surface, be pushed directly into the machine tool 10, where its inner end is centered below the opening 28 by the tunnels 31, 33.

What is claimed is:

1. A machine tool comprising a machine base, supporting a working area, in which working area workpieces are machined, said machine base comprising a device for receiving chips from the working area that are formed during machining of the workpieces, said device conveying said chips away,
    at least one tunnel being provided in said machine base, said at least one tunnel extending from an opening at a side of the machine base to at least to below the device and being provided for receiving one end of a chip conveyer,
    whereby said at least one tunnel is upwardly open at least below said device, and wherein said at least one tunnel widens in a funnel shape in a horizontal direction toward the opening.

2. The machine tool of claim 1, wherein said at least one tunnel includes a tunnel that extends transversely through said machine base from a first longitudinal side to a second longitudinal side of the machine tool, whereby said at least one tunnel has an opening in each one of said longitudinal sides for receiving said one end of said chip conveyer.

3. The machine tool of claim 2, wherein said at least one tunnel also includes a tunnel which extends in a longitudinal direction of the machine tool from said device to a rear side of said machine tool, whereby said longitudinal tunnel has an opening at the rear side for receiving said one end of said chip conveyer.

4. The machine tool of claim 2, wherein a switch cabinet is arranged at a rear side of the machine tool, said switch cabinet extending over an opening in said rear side in a U-shape from above.

5. The machine tool of claim 1, wherein said at least one tunnel includes a tunnel that extends in a longitudinal direction of the machine tool from said device to a rear side of said machine tool, whereby said at least one tunnel has an opening at the rear side for receiving said one end of said chip conveyer.

6. The machine tool of claim 5, wherein a switch cabinet is arranged at said rear side, said switch cabinet extending over said opening in said rear side in a U-shape from above.

7. The machine tool of claim 1, wherein a switch cabinet is arranged at a rear side of the machine tool, said switch cabinet extending over opening in said rear side in a U-shape from above.

8. The machine tool of claim 1, wherein said at least one tunnel is at least partially downwardly open.

9. The machine tool of claim 1, wherein said machine tool has at least one tool spindle for receiving tools for performing said machining and a workpiece table for clamping said workpieces, whereby said at least one tool spindle and said workpiece table are movable relative to one another.

10. The machine tool of claim 9, wherein said at least one tool spindle is mounted on said machine base via a traversing apparatus.

11. A machine tool comprising a machine base, supporting a working area, in which working area workpieces are machined, said machine base comprising a device for receiving chips from the working area that are formed during machining of the workpieces, said device conveying said chips away,
    at least one tunnel being provided in said machine base, said at least one tunnel extending at least to below the device and being provided for receiving one end of a chip conveyer,
    whereby said at least one tunnel is upwardly open at least below said device, wherein said at least one tunnel extends transversely through said machine base from a first longitudinal side to a second longitudinal side of the machine tool, whereby said at least one tunnel has an opening in each one of said longitudinal sides for receiving said one end of said chip conveyer, and wherein a switch cabinet is arranged at a rear side of the machine tool, said switch cabinet extending over an opening in said rear side in a U-shape from above.

12. A machine tool comprising a machine base, supporting a working area, in which working area workpieces are machined by tools received in a tool spindle, said machine base comprising a device for receiving chips from the working area that are formed during machining of the workpieces, said device conveying said chips away, at least one tunnel being provided in said machine base, said at least one tunnel extending at least to below the device and being provided for receiving one end of a chip conveyer, whereby said at least one tunnel is upwardly open at least below said device, said at least one tunnel extends in a longitudinal direction of the machine tool from said device to a rear side of said machine tool, whereby said at least one tunnel has an opening at the rear side for receiving said one end of said chip conveyer, and wherein said at least one tunnel widens in a funnel shape in a horizontal direction toward the opening.

13. A machine tool comprising a machine base, supporting a working area, in which working area workpieces are machined, said machine base comprising a device for receiving chips from the working area that are formed during machining of the workpieces, said device conveying said chips away, at least one tunnel being provided in said machine base, said at least one tunnel extending at least to below the device and being provided for receiving one end of a chip conveyer, whereby said at least one tunnel is upwardly open at least below said device, said at least one tunnel extends in a longitudinal direction of the machine tool from said device to a rear side of said machine tool, whereby said at least one tunnel has an opening at the rear side for receiving said one end of said chip conveyer, wherein a switch cabinet is arranged at said rear side, said switch cabinet extending over said opening in said rear side in a U-shape from above.

14. A machine tool comprising a machine base, supporting a working area, in which working area workpieces are machined, said machine base comprising a device for receiving chips from the working area that are formed during machining of the workpieces, said device conveying said chips away, at least one tunnel being provided in said machine base, said at least one tunnel extending at least to below the device and being provided for receiving one end of a chip conveyer, whereby said at least one tunnel is upwardly open at least below said device, wherein said at least one tunnel includes a tunnel that extends transversely through said machine base from a first longitudinal side to a second longitudinal side of the machine tool, whereby said transverse tunnel has an opening in each one of said longitudinal sides for receiving said one end of said chip conveyer, wherein said at least one tunnel also includes a tunnel that extends in a longitudinal direction of the machine tool from said device to a rear side of said machine tool, whereby said longitudinal tunnel has an opening at the rear side for receiving said one end of said chip conveyer, wherein a switch cabinet is arranged at said rear side, said switch cabinet extending over said opening in said rear side in a U-shape from above.

\* \* \* \* \*

UNITED STATES PATENT AND TRADEMARK OFFICE
CERTIFICATE OF CORRECTION

PATENT NO. : 7,165,919 B2 Page 1 of 1
APPLICATION NO. : 11/218394
DATED : January 23, 2007
INVENTOR(S) : Anton Richard Schweizer et al.

It is certified that error appears in the above-identified patent and that said Letters Patent is hereby corrected as shown below:

<u>Title Page</u>;
Item [30] Foreign Application Priority Data, "10 2004 044" should be
-- 10 2004 044 098.0 --

<u>Column 6</u>,
Line 44, after "over" insert -- an --.

Signed and Sealed this

Twenty-second Day of May, 2007

JON W. DUDAS
*Director of the United States Patent and Trademark Office*